No. 644,413. Patented Feb. 27, 1900.
J. S. DURNING.
AXLE AND WHEEL.
(Application filed Aug. 9, 1898.)
(No Model.)
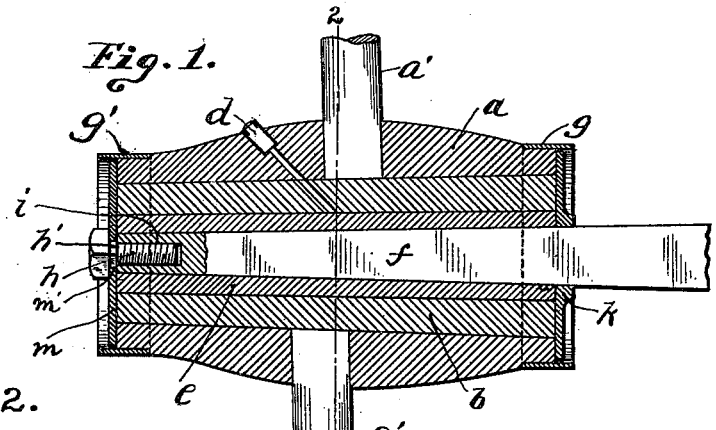
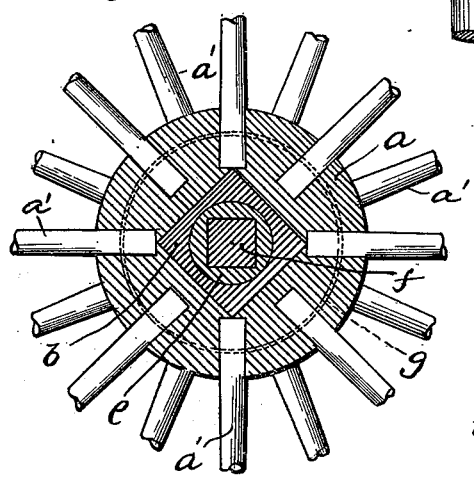
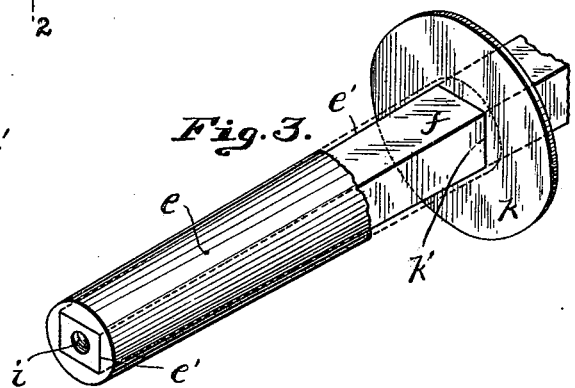
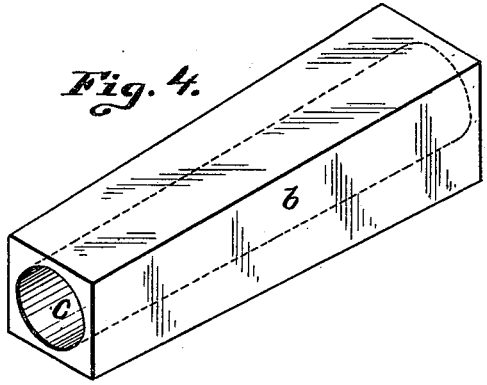
Witnesses:
Inventor:
Joseph S. Durning
By Kay & Totten
Attorneys.

UNITED STATES PATENT OFFICE.

JOSEPH S. DURNING, OF EMSWORTH, PENNSYLVANIA.

AXLE AND WHEEL.

SPECIFICATION forming part of Letters Patent No. 644,413, dated February 27, 1900.

Application filed August 9, 1898. Serial No. 688,222. (No model.)

*To all whom it may concern:*

Be it known that I, JOSEPH S. DURNING, a resident of Emsworth, in the county of Allegheny and State of Pennsylvania, have invented a new and useful Improvement in Axles and Wheels; and I do hereby declare the following to be a full, clear, and exact description thereof.

My invention relates to axles and wheels, its object being to provide simple forms of such axles and wheels for regular wagon-wheels in which a square wrought-metal axle can be employed in connection with a sleeve fitting around the same, which forms the bearing on the axle, and washers at each end of the sleeve for confining the parts, such as where they close the ends of the hub as dust-guards, such construction in regular vehicle-wheels being used in connection with a box having a square tapering body fitting in the seat and having the regular tapering passage through the same to receive the axle. The particular points of invention will be hereinafter specifically set forth and claimed.

To enable others skilled in the art to make and use my invention, I will describe the same more fully, referring to the accompanying drawings, in which—

Figure 1 is a sectional view of a hub of a vehicle wheel and axle having the invention applied thereto. Fig. 2 is a cross-section on the line 2 2, Fig. 1. Fig. 3 is a perspective view of the end of the axle, showing the sleeve thereon partly broken away and indicating the axle in dotted lines. Fig. 4 is a perspective view of the wagon-box.

Like letters of reference indicate like parts in each figure.

When the invention is used in connection with ordinary vehicle-wheels, I employ a wooden or like hub $a$, having the spokes $a'$, the hub having a square central passage, which, as shown in Fig. 1, is tapering from the inner to the outer end of the hub. Fitting within this hub is the wagon-box $b$, the body or outer portion of which corresponds exactly to the shape of the central passage of the hub, so that the contour of the central passage can be clearly understood from the perspective view of the wagon-box, as shown in Fig. 4. By forming the wagon-box both square and tapering, as stated, it wedges firmly within the hub and gives a strong hold or bind between the hub and box. Extending through the wagon-box $b$ is the central passage $c$ for the axle, which is preferably made on the regular taper as shown in the drawings. The hub is also preferably provided with the oil-cup $d$, which passes through both hub-body and wagon-box, so as to deliver the oil upon the sleeve or bearing $e$, which surrounds the square axle $f$. The hub is also preferably provided with the bands $g$ $g'$, one at each end, which instead of fitting flush with the edges of the hub are arranged to extend out a short distance beyond the same, such construction being employed as part of the dust-guard construction hereinafter described. The axle $f$ is also square in cross-section, as shown, and its end portions are formed tapering, as illustrated in the drawings, the taper extending down to the outer ends of the axle. Such form of axle gives great strength, and at the same time it can be easily and cheaply made—that is, at smaller cost than the ordinary cylindrical axle, which must be forged up from the square bar.

It is to be noticed that the axle-body is tapering, as above described, from a point beyond the end portions, which are arranged, as herein described, to receive the parts for building up the wheel-supporting construction. This is the natural way to forge the axle-body instead of forging it down to form a shoulder, which will either act itself to prevent inward movement of the parts or act as a shoulder against which the disk or wheel is forced.

It will be noticed that at the outer end of the axle is the threaded seat $i$ for the bolt $h$, which secures the hub upon the axle, this threaded seat being either right or left hand, according to the side of the vehicle on which the hub is placed, the thread being placed on one or the other side of the vehicle, so that the rotation of the wheel will tend to screw the bolt into the axle rather than loosen the same. To build up the wheel, I employ, first, the washer $k$, (more clearly shown in Fig. 3,) which has a square passage $k'$ of such size that it can be forced tightly, by wedging action, upon the continuously-tapering square body of the axle $f$ in proper position to take the strain of the wheel, this bearing-plate or washer being, as shown in Fig. 1, of a diameter to fit neatly within the inner metal band $g$ of the hub, so that when the hub is placed upon the axle it serves to form a dust-guard in connection with said band and the hub-body. Fitting around the square tapering axle $f$ is the sleeve $e$, above referred to, which has an inner square tapering central passage $e'$, corresponding to the square body of the axle, so that the sleeve can fit neatly upon said square body and so with the wagon-box $b$ form a wearing-surface between the hub and axle, the outer surface of the sleeve $e$ being, of course, cylindrical and tapering, corresponding to the passage $c$ of the hub $b$. This sleeve $e$ can be made of brass or other suitable antifriction metal and will serve to give much lighter running to the vehicle, while if it does wear it can be easily slipped from the axle $f$ and replaced by a new like sleeve. It will be noticed that as the wheel is built up, as shown in Fig. 1, the outer ends of the axle $f$, sleeve $e$, box $b$, and hub $a$ are substantially flush, and this construction is preferred, though it is preferred that the axle and its sleeve shall be a fraction longer than the hub-body and its box, just enough to give sufficiently free movement to the hub. To bind all the parts upon the axle in addition to the bolt $h$, above referred to, I employ the washer $m$, which washer is of a diameter to fit neatly within the outer band $g'$ of the hub and to cover and inclose the entire outer face of both hub and axle. To hold it from turning, it is formed with a square seat $m'$, within which a square neck $h'$ of the bolt $h$ fits, so that when the bolt is screwed firmly to place in the end of the axle it binds this plate firmly against the end of the axle and its sleeve and through the plate or washer holds the hub and sleeve upon the axle. By the employment of a threaded bolt hole or seat in the end of the axle I am enabled to do away with the ordinary threaded boss on the axle, which is one of the principal points of weakness in the ordinary axle construction.

When the invention as above described is in use, the bearing-plate or washer $k$ of course forms part of the axle-body, and the sleeve $e$ is slipped up against such plate, and the hub $a$, with its box $b$, slipped over the sleeve $e$, the confining-plate or washer $m$ is placed within the flange $g'$, and the bolt $h$ screwed down to place. As the wheel revolves, the hub and its box, with the flanged hubs $g\ g'$, rotate, while the axle and its bearing-plate $k$, sleeve $e$, confining-plate, and bolt are held from rotation, and as the bearing-plate $k$ and confining-plate $m$ fit neatly within the projecting ends of the bands $g\ g'$ a practically dust-proof wheel connection is obtained. As wear comes upon the wagon-box and sleeve, these parts can, when necessary, be changed, and this especially gives life to the axle itself, which has heretofore been required to take the wear of the wagon-box thereon. I am also enabled to employ a metal which has greater antifriction properties for the sleeve and also, for that matter, for the wagon-box, while the invention is simple in construction and makes it possible to employ both a square tapering axle-body and a square tapering axle-box.

While I have described the axles and wagon-boxes as having square outer bodies and the sleeve, hub, &c., conforming to the same, I include within my invention other suitable regular angular forms for these parts, such as pentagonal, hexagonal, &c., which, of course, may be employed without departing from the spirit of the invention.

What I claim as my invention, and desire to secure by Letters Patent, is—

1. The combination with a tapering axle-body, of a disk firmly secured thereon and having a circular outer edge, a hub fitting the bearing-surface of the axle and having an annular projecting band extending over the disk and close to the edge thereof, a disk confining the hub upon the axle and an annular band on the opposite end of the hub and extending around said disk close to the edge thereof, substantially as set forth.

2. The combination of a square, tapering axle-body, with a disk firmly secured thereon, a sleeve fitting around the square, tapering axle-body and having a cylindrical outer face, and a hub fitting around the sleeve and having an annular projecting band extending over the disk, a disk confining the sleeve and hub upon the axle and an annular band on the hub at the opposite end of the hub and extending around the said disk, substantially as set forth.

3. The combination of a square, tapering axle-body having a threaded seat or bolt-hole in its outer end, with a disk secured upon the axle-body, a sleeve fitting around said body and having a cylindrical outer face, a hub fitting upon said sleeve, a confining plate or disk holding the sleeve and hub upon the axle, said plate having an angular central opening, and a bolt having an angular neck fitting the plate and engaging the bolt-hole of the axle, substantially as set forth.

In testimony whereof I, the said JOSEPH S. DURNING, have hereunto set my hand.

JOSEPH S. DURNING.

Witnesses:
JAMES I. KAY,
LINDSAY DE B. LITTLE.